(12) United States Patent
Lee et al.

(10) Patent No.: US 8,588,189 B2
(45) Date of Patent: Nov. 19, 2013

(54) WIRELESS INTERNET TERMINAL AND PACKET TRANSMISSION METHOD FOR IMPROVING QUALITY OF SERVICE

(75) Inventors: Seung-Que Lee, Daejeon (KR); Nam-Hoon Park, Daejeon (KR); Jee-Hwan Ahn, Daejeon (KR); Choong-Ho Cho, Cheonan (KR)

(73) Assignees: Electronics and Telecommunications Research Institute (KR); Samsung Electronics Co., Ltd (KR); KT Corporation (KR); SK Telecom Co., Ltd (KR); KTFreetel Co., Ltd (KR); Hanaro Telecom., Inc. (KR)

(*) Notice: Subject to any disclaimer, the term of this patent is extended or adjusted under 35 U.S.C. 154(b) by 604 days.

(21) Appl. No.: 10/583,792

(22) PCT Filed: Sep. 22, 2004

(86) PCT No.: PCT/KR2004/002435
§ 371 (c)(1),
(2), (4) Date: Apr. 2, 2007

(87) PCT Pub. No.: WO2005/060357
PCT Pub. Date: Jul. 7, 2005

(65) Prior Publication Data
US 2008/0267140 A1 Oct. 30, 2008

(30) Foreign Application Priority Data
Dec. 22, 2003 (KR) .................. 10-2003-0095011

(51) Int. Cl.
*H04W 24/00* (2009.01)
(52) U.S. Cl.
USPC ........ 370/337; 370/329; 455/450; 455/452.2; 455/550.1

(58) Field of Classification Search
USPC ............ 370/337, 329; 455/450, 452.2, 550.1
See application file for complete search history.

(56) References Cited

U.S. PATENT DOCUMENTS 6,049,549 A * 4/2000 Ganz et al. ............... 370/449
6,091,709 A * 7/2000 Harrison et al. .......... 370/235
(Continued)

FOREIGN PATENT DOCUMENTS

| JP | 2000244523 | 9/2000 |
| JP | 2003110575 | 4/2003 |
| JP | 2005065226 | 3/2005 |

OTHER PUBLICATIONS

Andrea Baiocchi, Francesca Cuomo & Sandro Bolognesi; "IP QoS Delivery in a Broadband Wireless Local Loop: MAC Protocol Definition and Performance Evaluation"; pp. 1608-1622; IEEE Journal on Selected Areas in Communications, vol. 18, No. 9 Sep. 2000.

(Continued)

*Primary Examiner* — Steven Kelley
(74) *Attorney, Agent, or Firm* — The Farrell Law Firm, P.C.

(57) ABSTRACT

Disclosed are a terminal of an OFDMA-TDMA wireless Internet system capable of reducing transmission delay time while securing QoS for uplink data and a packet transmission method. A MAC layer of the terminal is divided into a MAC software part and a MAC hardware part to control priorities of data packets at a high level and low level. The high level priority controller carries out various fine control operations according to a QoS policy and the low level priority controller performs mechanical control operations based on a predetermined simple fixed priority policy.

7 Claims, 7 Drawing Sheets

(56) References Cited

U.S. PATENT DOCUMENTS

| | | | |
|---|---|---|---|
| 6,188,698 B1* | 2/2001 | Galand et al. | 370/412 |
| 6,459,687 B1* | 10/2002 | Bourlas et al. | 370/328 |
| 6,628,629 B1* | 9/2003 | Jorgensen | 370/322 |
| 6,678,248 B1* | 1/2004 | Haddock et al. | 370/235 |
| 6,839,345 B2* | 1/2005 | Lu et al. | 370/365 |
| 6,850,540 B1* | 2/2005 | Peisa et al. | 370/468 |
| 6,859,438 B2* | 2/2005 | Haddock et al. | 370/235 |
| 7,095,715 B2* | 8/2006 | Buckman et al. | 370/230 |
| 7,116,680 B1* | 10/2006 | Kramer et al. | 370/465 |
| 7,145,895 B2* | 12/2006 | Mueckenheim et al. | 370/348 |
| 7,190,684 B2* | 3/2007 | Cao et al. | 370/335 |
| 7,324,524 B2* | 1/2008 | Kloth et al. | 370/395.51 |
| 7,461,164 B2* | 12/2008 | Edwards et al. | 709/236 |
| 7,554,980 B1* | 6/2009 | Yeh et al. | 370/392 |
| 7,567,537 B1* | 7/2009 | Gurbuz et al. | 370/338 |
| 7,724,749 B2* | 5/2010 | Terry et al. | 370/395.4 |
| 2002/0075882 A1* | 6/2002 | Donis et al. | 370/412 |
| 2004/0160960 A1* | 8/2004 | Monta et al. | 370/395.4 |
| 2006/0034175 A1* | 2/2006 | Herrmann | 370/236 |

OTHER PUBLICATIONS

Francesca Cuomo, Andrea Baiocchi, & Roberto Cautelier, University of Rome "La Sapienza"; "A MAC Protocol for a Wireless LAN Based on OFDM-CDMA"; pp. 152-159; IEEE Communications Magazine, Sep. 2000.

* cited by examiner

WIRELESS INTERNET TERMINAL AND PACKET TRANSMISSION METHOD FOR IMPROVING QUALITY OF SERVICE

TECHNICAL FIELD

The present invention relates to a wireless Internet terminal and a packet transmission method for reducing packet transmission delay time while securing QoS (Quality of Service). More specifically, the present invention relates to construction of a terminal MAC (Media Access Control) layer for minimizing a delay generated when a terminal transmits uplink data in a wireless Internet system using OFDMA-TDMA.

BACKGROUND ART

An OFDMA-TDMA system uses OFDM (Orthogonal Frequency Division Multiplex) for modulation and demodulation of data and uses TDMA (Time Division Multiple Access) for user multiplexing. The OFDMA-TDMA system has a coordinator that manages and schedules bandwidths such that, when a terminal requiring to transmit data requests the OFDMA-TDMA system to allocate a bandwidth, the coordinator allocates the bandwidth to the terminal. Then, the terminal transmits data using the allocated bandwidth.

Figure 1:
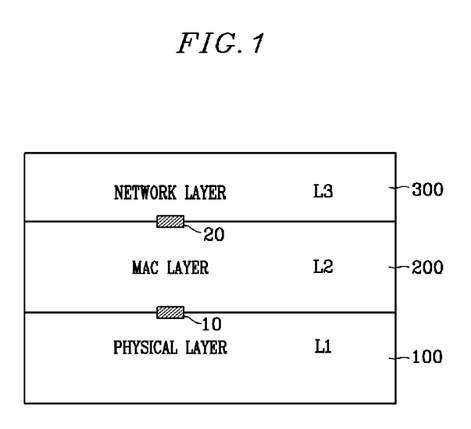
FIG. 1 illustrates layers of a wireless Internet system.

FIG. 1 illustrates layers of a wireless Internet system. Referring to FIG. 1, the wireless Internet system includes a physical layer 100, a MAC layer 200, and a network layer 300. These layers can be called first, second and third layers L1, L2 and L3, respectively. If required, the wireless Internet system can further have upper layers.

The physical layer 100 manages a modulation method and multiple access RF processing and the MAC layer 200 takes charge of a function of controlling access of the physical layer, such as address allocation, access coordination and frame checking. The network layer 300 manages routing and congestion control. The layers 100, 200 and 300 control an operation between adjacent layers through server access points 10 and 20.

Figure 2:
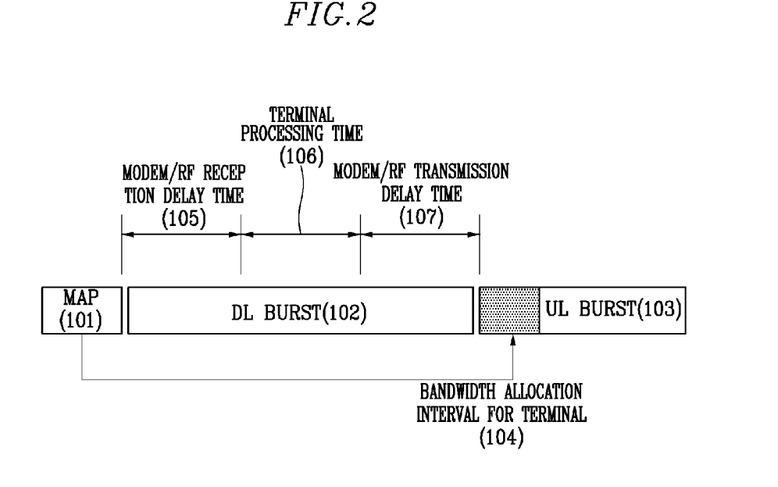
FIG. 2 illustrates a frame structure of a conventional OFDMA-TDMA system.

FIG. 2 illustrates a frame structure of a conventional OFDMA-TDMA system. Referring to FIG. 2, a MAP 101, which is a MAC layer message, defines the number of resources and sub channels allocated by a terminal and serves as indexes of designating components of a downlink burst DL-BURST 102 and an uplink burst UL-BURST 103 that follow the MAP 101. The MAP 101 is classified into an uplink MAP UL-MAP and a downlink MAP DL-MAP depending on a link direction.

If a terminal previously requests an OFDMA-TDMA system to allocate a specific bandwidth, the coordinator of the OFDMA-TDMA system allocates the bandwidth to the frame. Then, the terminal analyzes the MAP 101 to confirm whether there is a bandwidth allocated thereto and transmits data using a bandwidth allocation interval 104 indicated by the MAP 101.

MAC is a protocol located above the physical layer managing RF and modem. Thus, data of the MAP 101 should be subjected to processes required for receiving RF and modem signals in order to reach the MAC layer. This generates a predetermined delay time 105.

Furthermore, when the MAC requires to transmit data in synchronization with a designated interval, the data must be subjected to processes required for transmitting RF and modem signals. Thus, the data should be transmitted a predetermined delay time 107 ahead of the actual data transmission time. Accordingly, the MAC of the terminal should begin to prepare data to be transmitted the RF/modem reception delay time 105 behind the moment of time when the frame of the data actually starts and end the preparation of the data the RF/modem transmission delay time 107 ahead of the time interval during which the bandwidth required for transmitting the data is allocated to the terminal.

When the ratio of the downlink burst DL-BURST to the uplink burst UP-BURST is approximately 7:3 and the modem/RF reception delay time 105 and transmission delay time 107 respectively occupy ⅓ of the downlink burst DL-BURST 102, a period of time required for the terminal to prepare a PDU (Protocol Data Unit) corresponds to approximately ⅓ of the downlink burst DL-BURST 102. The ratio of each of the modem/RF reception delay time 105 and transmission delay time 107 to the entire frame interval is 7/10×⅓, which corresponds to approximately ¼ of a single frame interval. This is very short time such that each of the modem/RF reception delay time 105 and transmission delay time 107 becomes 1.35 msec when a single frame interval is 5 msec.

The terminal should transmit data based on QoS. QoS means network capability providing a method of reducing network traffic or making a reservation of some of bandwidths in advance. Network managers provide QoS to their networks in many ways. QoS does not mean 100% guarantee of bandwidths or packet loss rate of 0%. However, the network managers manage traffic transmission using a method of transmitting a specific traffic more rapidly or making a reservation of network bandwidths through QoS.

A variety of techniques with respect to QoS, such as IEEE 802.1p, differential service, RSVP (Resource Reservation Protocol), IP multiplexing and so on, have been disclosed.

For QoS, it is required that data packets to be transmitted are classified, priorities of the data packets are determined in consideration of importance or urgency of the data packets, and the data packets are transmitted based on their priorities. Here, an internal algorithm is executed with reference to a profile including QoS characteristic. This process is an operation with high complexity and thus the operation is generally processed by software.

However, a period of time during which a terminal recognizes bandwidth allocation and then transmits data using the allocated bandwidth is very short. Thus, QoS-based data transmission is difficult to carry out by software within the period of time. If the QoS-based transmission is executed by hardware, it is difficult to finely control the QoS-based transmission in various manners though the transmission can be carried out within the period of time.

Furthermore, when the coordinator allocates a bandwidth to the next frame not the current frame, the terminal is given extended time including a single frame interval added thereto and thus the QoS-based data transmission can be performed by software. In this case, however, data transmission is delayed due to the extended time given to the terminal. This can deteriorate quality of upper application programs and bring about serious problems in the case of real-time application.

As described above, when the terminal transmits uplink data based on QoS in the OFDMA-TDMA system, there are problems in both cases of processing the data transmission by software and hardware.

DISCLOSURE OF INVENTION

Technical Problem

It is an advantage of the present invention to provide a wireless Internet system having a single MAC layer structure that reflects QoS characteristic and satisfies a time restriction and a packet transmission method.

Technical Solution

In one aspect of the present invention, an OFDMA-TDMA based wireless Internet terminal comprises a QoS profile storing information about a QoS policy; a classifier for classifying data packets to be transmitted according to the QoS policy; a first module including a first priority controller that gives priorities to the classified data packets according to the QoS policy; a PDU maker for generating PDUs from the data packets given the priorities; a second priority controller for determining priorities of the PDUs according to a predetermined policy; and a second module arranging the PDUs in an allocated bandwidth to transmit the PDUs.

BRIEF DESCRIPTION OF THE DRAWINGS

The accompanying drawings, which are incorporated in and constitute a part of the specification, illustrate an embodiment of the invention, and, together with the description, serve to explain the principles of the invention.

BEST MODE FOR CARRYING OUT THE INVENTION

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Figure 3:
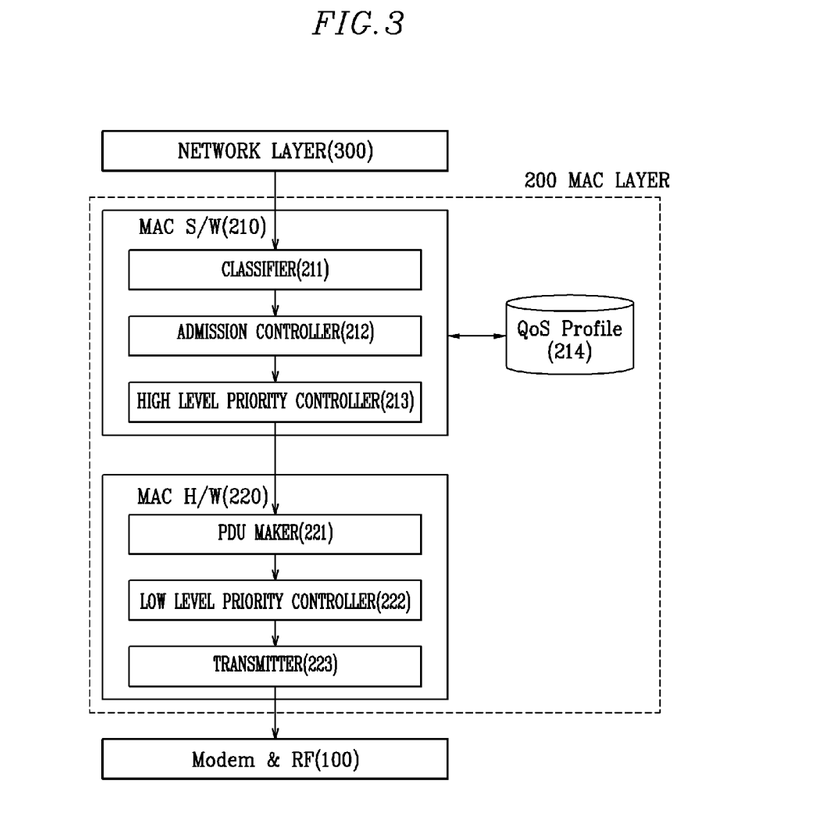
FIG. 3 is a block diagram showing the structure of a terminal MAC of a wireless Internet system according to an embodiment of the present invention.

FIG. 3 is a block diagram showing the structure of a terminal MAC layer of a wireless Internet system according to an embodiment of the present invention. The structure does not show a control plane part of the MAC layer but shows only a user plane part. Uplink data is transmitted from a network layer 300 to a modem/RF part 100 through the MAC layer 200.

The present invention processes the QoS function of the MAC using a MAC software part and a MAC hardware part. Referring to FIG. 3, the basic structure of the MAC layer 200 according to the present invention includes the MAC software part 210 having a classifier 211, an admission controller 212 and a high level priority controller 213 and the MAC hardware part 220 having a PDU maker 221, a low level priority controller 222 and a transmitter 223. In addition, the MAC layer 200 further includes a QoS profile 216 storing a QoS policy. The MAC software part 210 and MAC hardware part 220 can be constructed in modular forms, respectively.

The MAC software part 210 processes an operation with high complexity and the MAC hardware part 220 processes an operation with low complexity. The MAC software part 210 is operated irrespective of the above-described restricted time to determine long-term QoS-based priorities while the MAC hardware part 220 is sensitive to the restricted time and determines short-term QoS-base priorities.

The MAC software part 210 includes the classifier 211, admission controller 212 and high level priority controller 213 as described above. The classifier 211 classifies received data packets by QoSs. The admission controller 212 discards data packets with a low degree of importance based on a network state. The high level priority controller 213 determines priorities of data packets that have passed the admission controller 212 according to the QoS policy and differentially transmits the data packets based on their priorities. The components 211, 212 and 213 carry out their functions with reference to the QoS profile 216 storing information about QoS characteristics.

The MAC hardware 220 includes the PDU maker 221, the low level priority controller 222 and a transmitter 223. The PDU maker 221 makes a MAC PDU. The low level priority controller 222 determines a priority of the MAC PDU according to a fixed policy to differentially transmit the MAC PDU based on the priority. The transmitter 223 is interfaced with the modem/RF layer 100 that is a lower layer of the MAC layer 200 to actually transmit the data.

The terminal MAC layer according to the present invention will now be explained in more detail.

Figure 4:
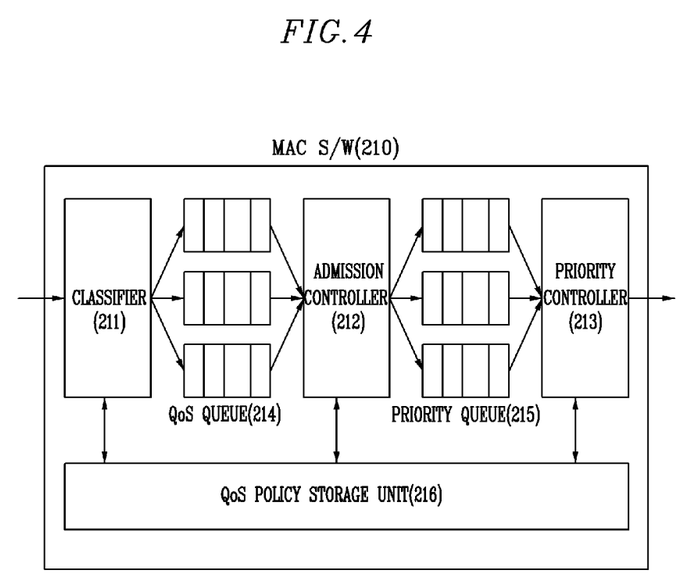
FIG. 4 is a block diagram showing a MAC software part according to an embodiment of the present invention.

FIG. 4 is a block diagram showing the structure of the MAC software part 210 according to an embodiment of the present invention. The MAC software part 210 internally operates a QoS queue 214 and a priority queue 215 in addition to the classifier 211, admission controller 212 and priority controller 213. The QoS queue 214 classifies data packets by QoSs and stores them. The priority queue 215 classifies data packets that have passed the admission controller 212 by priorities and stores the classified data packets.

Specifically, the classifier 211 classifies data packets from the network layer based on a selected QoS profile and selectively stores the data packets in the QoS queue 214. The type of packet traffic is identified and the packets stand by in the QoS queue 214. For example, data items having different characteristics such as audio data and burst data can be stored and stand by in the QoS queue 214 according to the QoS policy based on information of the QoS profile.

The admission controller 212 determines whether the data packets from the QoS queue 214 are admitted or discarded to selectively store the data packets in the priority queue 215. The admission controller 212 selectively stores the data packets in the priority queue 215 according to available traffic state of the current call and the QoS policy.

The high level priority controller 213 gives priorities to the packets stored in the priority queue 215 based on the QoS policy. For example, audio data that requires real-time transmission is given priority higher than priority given to e-mail data that tolerates transmission delay.

As described above, the MAC software part 210 executes a function that is less sensitive to time, reflects QoS characteristic and makes various fine decisions.

Figure 5:
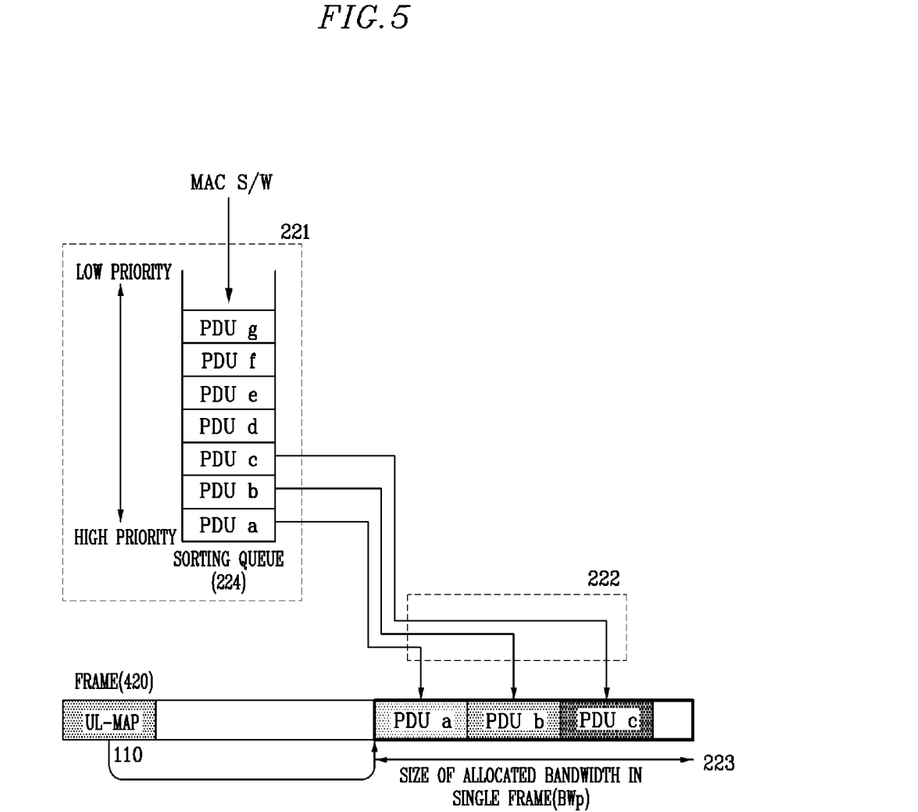
FIG. 5 is a block diagram showing a MAC hardware part of a MAC layer according to an embodiment of the present invention.

FIG. 5 is a block diagram showing the MAC hardware part 220 of the MAC layer according to an embodiment of the present invention. Referring to FIG. 5, high-level-priority-controlled packets are sent from the MAC software part 210 to the MAC hardware part based on their priorities. The PDU maker 221 of the MAC hardware part adds overhead bits to the packets to generate MAC PDUs. The generated MAC PDUs are sequentially sorted and stand by in a sorting queue 224 by the low level priority controller 222.

The sorting queue 224 sorts the generated PDUs based on a fixed priority policy and maintains the sorted PDUs. The fixed priority policy is to mechanically give priorities to packets in the order of an ACK packet, a management message packet and user a data packet. That is, the low level priority controller 222 controls priorities based on a mechanical low-level policy capable of controlling priority.

In the sorting queue 224, the packet having the highest priority is located at the bottom and packets having low priorities are placed above the packet having the highest priority.

When a bandwidth is allocated, the PDUs arranged by the priority controller 222 are sequentially extracted from the sorting queue 225 from the bottom to the top of the sorting queue and fill the allocated bandwidth. For example, when a bandwidth allocated to a terminal is detected from an uplink MAP UL-MAP 110 of a frame, the MAC hardware part sequentially extracts the PDUs standing by in the sorting queue from a high priority PDU to a low priority PDU (PDD a, PDD b, PDD c, . . . ) within a range that does not exceed the length of the allocated bandwidth and locates the extracted PDUs in the allocated bandwidth BWp.

The transmitter 223 transmits the frame having the allocated bandwidth filled with the PDUs.

As described above, the present invention can carry out QoS-based priority control and overcome a time restriction that is given to the MAC after the uplink MAP according to the two priority control steps executed by the MAC software part and MAC hardware part. This enables packet transmission without having a delay.

Figure 6:
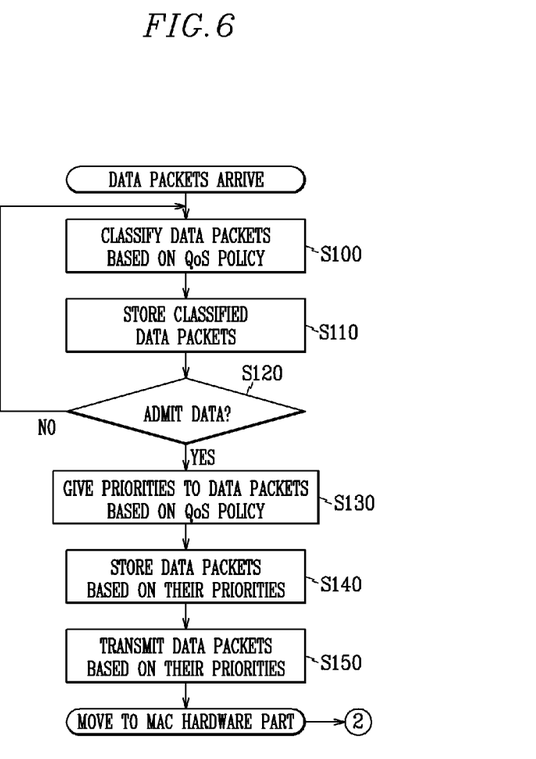
FIG. 6 is a flow chart showing a part of a packet processing method according to an embodiment of the present invention.

FIG. 6 is a flow chart showing a part of a packet processing method according to an embodiment of the present invention.

Data packets transmitted from the network layer of the wireless Internet system are classified according to the QoS policy in the step S100. The QoS policy maximizes a bandwidth utilization rate and minimizes a packet loss rate in the current communication environment. The QoS policy is reflected on the data classification based on a QoS profile.

The classified data packets are stored and stand by in the QoS queue in the step S110. The QoS queue sequentially stores data packets classified based on different QoS policies in different queues.

An admission control algorithm determines whether the data packets stored in the QoS queue are admitted in the step S120. The admission control algorithm determines whether the data packets are transmitted or not with reference to the current call state and data characteristics. Data packets that are not allowed to be admitted are discarded and data packets allowed to be admitted are moved to the next step.

The data packets allowed to be admitted are given priorities based on the QoS policy in the step S130. Here, the priorities are given to the data packets through a software process in consideration of importance and urgency according to traffic characteristic and QoS capability defining the QoS profile.

As described above, the data packets with priorities are classified again based on their priorities and sequentially stored in the priority queue in the step S140. The stored data packets are sequentially transmitted to the MAC hardware part starting from a data packet with high priority to a data packet with low priority in the step S150.

Figure 7:
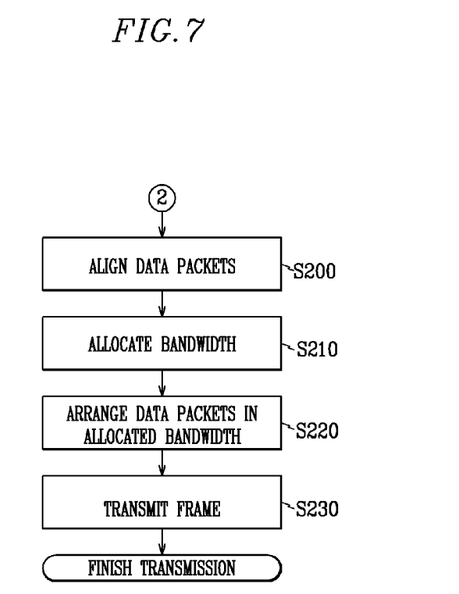
FIG. 7 is a flow chart showing another part of the packet processing method according to the present invention.

FIG. 7 is a flow chart showing another part of the packet processing method according to the present invention.

The data packets, which are given priorities based on the QoS software part, are transmitted from the MAC software part to the MAC hardware part based on their priories and arranged. The transmitted data packets are aligned in the sorting queue through a mechanical process. That is, the data packets are mechanically aligned starting from a packet with high priority to a packet with low priority based on headers or identifiers of the packets in the step 200.

When a bandwidth is allocated as instructed by a MAP in the step S210, the aligned packets are mechanically arranged in the allocated bandwidth in the step S220. Accordingly, when the instruction of the MAP is recognized, the packets are arranged in the allocated bandwidth within relatively short period of time without respect to QoS.

When the packets are arranged in the allocated bandwidth, a frame that is a PDU of the physical layer is generated and transmitted in the step S230. As described above, the period of time required for the MAC hardware part to recognize the MAP and arrange the packets is sufficiently short and thus transmission delay time for transmitting the frame can be also sufficiently secured.

While this invention has been described in connection with what is presently considered to be the most practical and preferred embodiment, it is to be understood that the invention is not limited to the disclosed embodiments, but, on the contrary, is intended to cover various modifications an equivalent arrangements included within the spirit and scope of the appended claims.

As described above, the terminal MAC structure of the OFDMA-TDMA wireless Internet system according to the present invention can remove packet delay while satisfying complicated and various QoS characteristics.

The invention claimed is:

1. An OFDMA-TDMA (Orthogonal Frequency Division Multiple Access-Time Division Multiple Access) based wireless Internet terminal comprising:
 a QoS profile storing information about a QoS policy;
 Media Access Control (MAC) layer software, comprising:
  a classifier configured to identify a type of packet traffic and classify data packets corresponding to the packet traffic according to the QoS policy stored in the QoS profile,
  an admission controller configured to determine admission or discard the classified data packets provided from a plurality of QoS queues based on a current call state and characteristics of the classified data packets, and
  a first priority controller configured to give first priorities to the admitted classified data packets according to the QoS policy; and
 MAC layer hardware, comprising:
  a PDU maker configured to generate PDUs from the data packets given the first priorities,
  a second priority controller configured to determine data packet types of the PDUs based on headers or an identifier of the PDUs and determine second priorities of the PDUs based on the determined data packet types and a predetermined priority policy that predetermines priorities of data packets according to a data packet type, wherein the second priorities are different from the first priorities;
  a sorting queue configured to store the PDUs based on the second priorities of the PDUs assigned by the second priority controller, and a transmitter configured to arrange the PDUs given the second priorities in an allocated bandwidth to transmit the PDUs;

wherein the MAC layer software further comprises the plurality of QoS queues for dividing and storing the data packets classified by the classifier, and a plurality of priority queues for dividing and storing the data packets admitted by the admission controller based on their first priorities, wherein the classifier identifies the type of packet traffic and stores a data packet of the packet traffic in one of the plurality of QoS queues based on the QoS policy corresponding to the identified type, wherein the admission controller stores the data packet, which is determined for admission, in one of the plurality of priority queues and discards data packets that have a degree of importance lower than a predetermined degree based on a network state, and wherein the type of the packet traffic comprises at least one of audio data and burst data, and wherein the PDUs are MAC PDUs, and the second priority controller determines which one among an ACK packet, a management message packet and a user data packet, a corresponding packet is, based on headers or identifiers of the MAC PDUs and gives the second priories to the MAC PDUS in the order of the ACK packet, the management message packet and the user data packet independently from the QoS profile.

2. The OFDMA-TDMA based wireless Internet terminal as claimed in claim 1, wherein the QoS policy maximizes a bandwidth utilization rate and minimizes a packet loss rate in a current communication environment.

3. The OFDMA-TDMA based wireless Internet terminal as claimed in claim 1, wherein a PDU having a highest priority is located at a bottom of the sorting queue.

4. The OFDMA-TDMA based wireless Internet terminal as claimed in claim 1, wherein the first priority controller gives data, which requires real-time transmission, a higher priority than data, which tolerates transmission delay, based on the QoS policy.

5. A packet processing method in a wireless Internet terminal, comprising:

identifying a type of data traffic and classifying and storing data packets corresponding to the data traffic based on a QoS policy;

determining admission or discarding of the classified data packets based on a current call state and characteristics of the classified data packets;

providing first priories to the data packets that are classified and admitted, based on the QoS policy;

storing the data packets given the first priorities in a queue and sequentially outputting the data packets based on their first priorities;

determining types of the data packets outputted from the queue according to packet information of the data packets given the first priorities and providing second priorities to the data packets based on the determined types and a predetermined priority policy that predetermined priorities of data packets according to a data packet type and is independent from the QoS policy, wherein the packet information is based on a header or an identifier of a corresponding data packet, and wherein the second priorities are different from the first priorities;

storing the data packets given second priorities based on the second priorities in a sorting queue; and arranging the data packets provided from the sorting queue in an allocated bandwidth;

wherein identifying the type of the data traffic, classifying and storing the data packets, determining admission or discarding of the classified data packets and providing the first priorities to the classified data packets are executed by software, and wherein providing the second priorities to the data packets and arranging the data packets are executed by hardware, wherein, in classifying and storing data packets, a data packet of the packet traffic is stored in one of a plurality of QoS queues based on the QoS policy corresponding to the identified type, wherein, in determining admission or discarding of the classified data packets, a data packet, which is determined for admission, is stored in one of a plurality of priority queues, and wherein the type of the packet traffic comprises at least one of audio data and burst data, data, and wherein providing the second priorities to the data packets determines which one among an ACK packet, a management message packet and a user data packet a corresponding packet is, based on headers or identifiers of MAC PDUs, independently of the QoS policy and gives the second priorities to the MAC PDUs in the order of the ACK packet, the management message packet and the user data packet independently from the OoS profile.

6. The packet processing method as claimed in claim 5, wherein a data packet having a highest priority is located at a bottom of the sorting queue.

7. The packet processing method as claimed in claim 5, wherein the QoS policy maximizes a bandwidth utilization rate and minimizes a packet loss rate in a current communication environment, and wherein providing the first priorities to the classified data packets gives data, which requires real-time transmission, a higher priority than data, which tolerates transmission delay, based on the QoS policy.

* * * * *